(12) United States Patent
Casazza et al.

(10) Patent No.: US 10,215,227 B2
(45) Date of Patent: Feb. 26, 2019

(54) CONTROL METHOD, PROGRAM AND SYSTEM FOR CONTROLLING THE BEARING PRELOAD OF A WIND TURBINE AND WIND TURBINE COMPRISING SUCH CONTROL SYSTEM

(71) Applicant: Windfin B.V., Leimuiden (NL)

(72) Inventors: Matteo Casazza, Val di Vizze (IT); Thomas Kaessner, Dresden (DE)

(73) Assignee: WINDFIN B.V., Leimuiden (NL)

( * ) Notice: Subject to any disclaimer, the term of this patent is extended or adjusted under 35 U.S.C. 154(b) by 230 days.

(21) Appl. No.: 14/419,860

(22) PCT Filed: Aug. 6, 2013

(86) PCT No.: PCT/IB2013/056443
§ 371 (c)(1),
(2) Date: Feb. 5, 2015

(87) PCT Pub. No.: WO2014/024139
PCT Pub. Date: Feb. 13, 2014

(65) Prior Publication Data
US 2015/0211572 A1 Jul. 30, 2015

(30) Foreign Application Priority Data

Aug. 6, 2012 (IT) .............................. MI2012A1395

(51) Int. Cl.
*F16C 19/00* (2006.01)
*F16C 19/52* (2006.01)
(Continued)

(52) U.S. Cl.
CPC .............. *F16C 19/525* (2013.01); *F03D 7/00* (2013.01); *F03D 7/042* (2013.01); *F03D 9/25* (2016.05);
(Continued)

(58) Field of Classification Search
CPC . F03D 7/00; F03D 7/042; F03D 80/70; F03D 9/002; F03D 11/0008; F03D 80/60;
(Continued)

(56) References Cited

U.S. PATENT DOCUMENTS 6,135,641 A * 10/2000 Smith ................... F16C 19/163
384/493
6,293,703 B1 * 9/2001 Date ....................... F16C 25/08
384/476

(Continued)

FOREIGN PATENT DOCUMENTS

DE 19944652 A1 * 5/2002 ........... D21G 1/0226
EP 1 992 829 11/2008

(Continued)

OTHER PUBLICATIONS

International Search Report and Written Opinion for International Application No. PCT/IB2013/056443 dated Nov. 20, 2013.
(Continued)

*Primary Examiner* — Christopher E. Everett
(74) *Attorney, Agent, or Firm* — Neal, Gerber & Eisenberg LLP

(57) ABSTRACT

A control method configured to control the preload of a bearing includes estimating the preload on the bearing; comparing the estimated preload with a predetermined acceptance range; and correcting the preload on the bearing when the preload is outside the acceptance range.

30 Claims, 5 Drawing Sheets

(51) Int. Cl.
*F03D 80/60* (2016.01)
*F03D 7/00* (2006.01)
*F16C 25/08* (2006.01)
*F03D 7/04* (2006.01)
*F16C 37/00* (2006.01)
*F03D 80/70* (2016.01)
*F03D 9/25* (2016.01)
*F16C 33/58* (2006.01)

(52) U.S. Cl.
CPC ............ *F03D 80/60* (2016.05); *F03D 80/70* (2016.05); *F16C 25/08* (2013.01); *F16C 37/007* (2013.01); *F16C 33/586* (2013.01); *F16C 2226/60* (2013.01); *F16C 2229/00* (2013.01); *F16C 2233/00* (2013.01); *F16C 2300/14* (2013.01); *F16C 2300/40* (2013.01); *F16C 2360/31* (2013.01); *Y02E 10/722* (2013.01); *Y02E 10/723* (2013.01)

(58) Field of Classification Search
CPC ...... F03D 9/25; F16C 19/525; F16C 2229/00; F16C 2233/00; F16C 2300/14; F16C 2300/40; F16C 2360/31; F16C 25/08; F16C 37/007; F16C 33/586; F16C 2226/60; Y02E 10/722; Y02E 10/723
See application file for complete search history.

(56) References Cited

U.S. PATENT DOCUMENTS

| | | | | |
|---|---|---|---|---|
| 7,082,772 | B2* | 8/2006 | Welch | F25B 21/04 257/E23.082 |
| 2009/0263062 | A1* | 10/2009 | Smith | F16C 19/163 384/476 |
| 2010/0226602 | A1* | 9/2010 | Laredius | D21D 1/30 384/448 |
| 2011/0037269 | A1* | 2/2011 | Poon | F16C 19/52 290/55 |
| 2011/0185823 | A1* | 8/2011 | Nishikawa | F16C 19/186 73/862.041 |
| 2015/0030277 | A1* | 1/2015 | Pick | F03D 11/0008 384/558 |

FOREIGN PATENT DOCUMENTS

| | | | | |
|---|---|---|---|---|
| EP | 2 110 569 | | 10/2009 | |
| EP | 2 290 250 | | 3/2011 | |
| EP | 2 880 322 B1 | | 10/2016 | |
| JP | 2002-54629 | | 2/2002 | |
| JP | 2008157340 A | * | 7/2008 | ............ F16C 19/525 |
| JP | 2012-21574 | | 2/2012 | |
| WO | WO-2012156456 A1 | * | 11/2012 | ............ F16C 19/525 |

OTHER PUBLICATIONS

PCT Demand (Form PCT/IPEA/401) for International Application No. PCT/IB2013/056443 dated Jun. 6, 2014.
Written Opinion of the International Preliminary Examining Authority (Form PCT/IPEA/408) for International Application No. PCT/IB2013/056443 dated Aug. 6, 2014.
Reply to Written Opinion of the International Preliminary Examining Authority for International Application No. PCT/IB2013/056443 dated Oct. 3, 2014.
Notification Concerning Informal Communications with the Applicant (Form PCT/IPEA/429) for International Application No. PCT/IB2013/056443 dated Oct. 22, 2014.
Reply to International Preliminary Examining Authority for International Application No. PCT/IB2013/056443 dated Nov. 11, 2014.
Notification of Transmittal of the International Preliminary Report on Patentability (Form PCT/IPEA/416) dated Nov. 21, 2014, and International Preliminary Report on Patentability (Form PCT/IPEA/409) for International Application No. PCT/IB2013/056443 dated Nov. 21, 2014.
Mexican Office Action for Mexican Patent Application No. MX/a/2015/001609 dated Jul. 19, 2017, 2 pages.

* cited by examiner

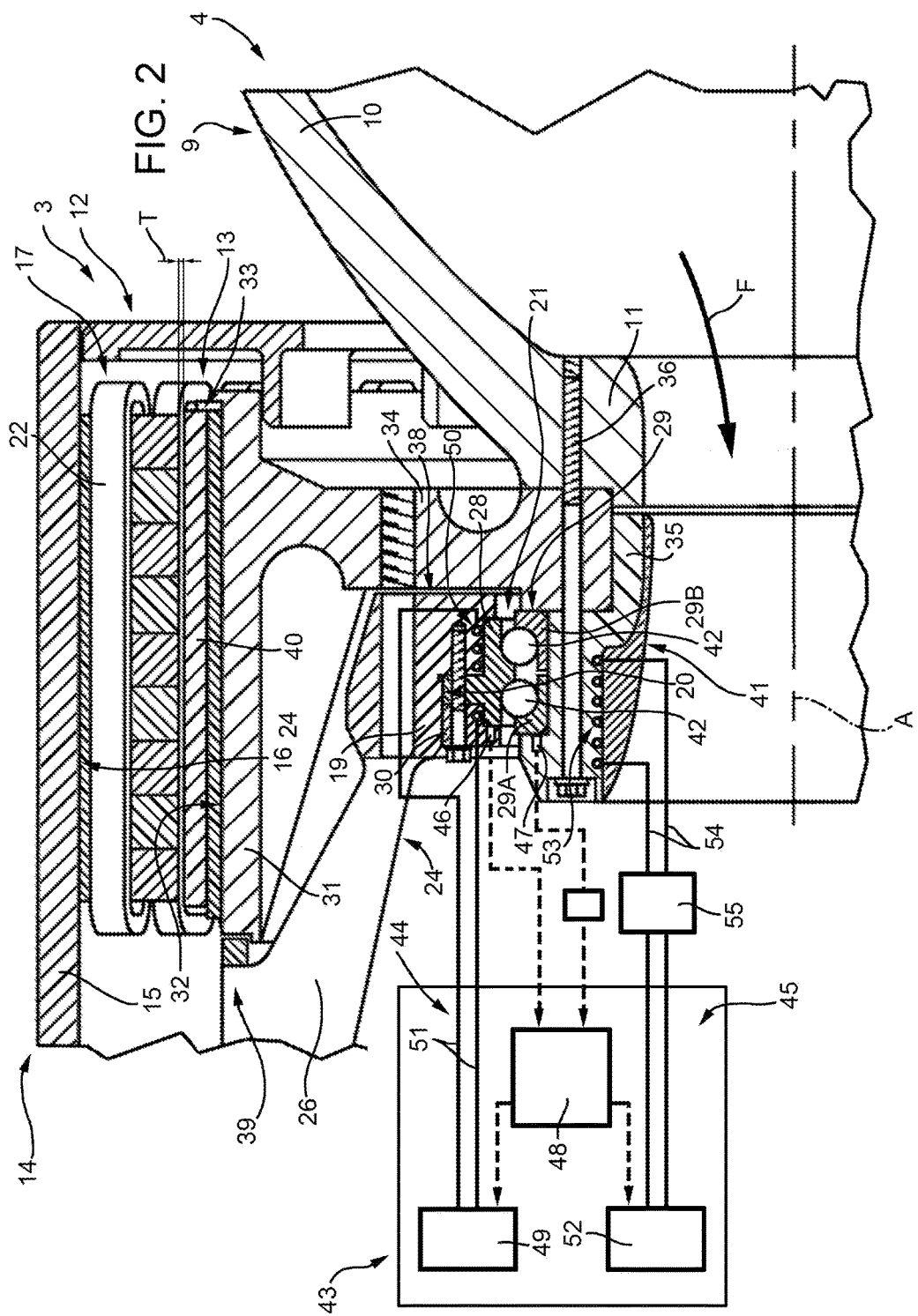

CONTROL METHOD, PROGRAM AND SYSTEM FOR CONTROLLING THE BEARING PRELOAD OF A WIND TURBINE AND WIND TURBINE COMPRISING SUCH CONTROL SYSTEM

PRIORITY CLAIM

This application is a national stage application of PCT/IB2013/056443, filed on Aug. 6, 2013, which claims the benefit of and priority to Italian Patent Application No. MI2012A 001395, filed on Aug. 6, 2012, the entire contents of which are each incorporated by reference herein.

BACKGROUND

Certain known wind turbines for producing electric energy normally comprise a main frame that rotates about a vertical axis; a blade assembly, which comprises a hub fitted with at least two blades, and is connected to the main frame by at least one bearing to permit rotation of the blade assembly about an axis of rotation; and a rotary electric machine, which is rotated by the blade assembly, and comprises a stator connected to the main frame, and a rotor connected to the blade assembly. Normally, the stator comprises a tubular first active part, and the rotor comprises a tubular second active part facing, and separated by an air gap from, the tubular first active part. The efficiency of a rotary electric machine is known to be affected significantly by the size of the air gap: the smaller the air gap, the greater the efficiency of the electric machine.

On direct-drive wind turbines, the blade assembly is connected rigidly to the rotor, and the bearing serves to support both the rotor and the blade assembly for rotation about the axis of rotation; and a fairly common practice is to employ one bearing designed to absorb radial and axial forces and tipping moments. Other wind turbine configurations employ two coaxial bearings.

The bearings used between the blade assembly and main frame of wind turbines are normally rolling bearings. A rolling bearing comprises an outer ring and an inner ring; and at least one ring of rolling bodies equally spaced about the axis of rotation, between the outer and inner rings. On wind turbines, it is generally good practice to assemble the rolling bearings with a relatively small amount of interference between the inner ring on one side, the outer ring on the other side, and the rolling bodies between the inner ring and outer ring. In other words, the bearing can be assembled to achieve a relatively small amount of both radial and axial interference. Rolling bearings may normally be assembled with interference or clearance; and in the following description, the term 'preload' is used to describe both interference and clearance configurations.

The set preload on the bearing at the installation stage may vary widely over time, depending on the temperature range at the wind turbine installation site, and on operating conditions, such as the heat generated by the rotary electric machine, friction in the bearing, and the efficiency of the cooling system. Changes in the preload of the bearing may produce relatively severe stress on the bearing, wear affecting the working life of the bearing, or slack which equally impairs the working life of the bearing and also alters the size of the air gap. Changes in the preload of the bearing therefore have a particularly harmful effect on the working life of the bearing and, in some situations, also on the efficiency of the electric machine.

These drawbacks are further compounded by the current trend towards relatively large-diameter rotary electric machines.

European Patent No. 2,290,250 discloses a method for controlling the temperature of a sleeve supporting two bearing at its opposite ends for a cartridge of drive-train of a geared wind turbine.

European Patent No. 1,992,829 discloses a method for controlling the temperature of bearing in machine tool.

Any one of these documents offers solutions that are not fully satisfactory for a direct drive wind turbine.

SUMMARY

The present disclosure relates to a method of controlling the preload of a wind turbine bearing.

It is an advantage of the present disclosure to provide a control method configured to control the preload of a wind turbine bearing, and which provides for achieving a relatively small air gap and, at the same time, ensuring a relatively long working life of the bearing.

According to the present disclosure, there is provided a control method configured to control the preload of a wind turbine bearing, the method comprising the steps of estimating the preload on the bearing at least as a function of the temperature of the outer ring and the inner ring; comparing the estimated preload with a predetermined acceptance range; and correcting the preload on the bearing when the preload is outside the acceptance range; detecting the temperature of the outer ring; detecting the temperature of the inner ring; calculating the temperature difference between the outer ring and the inner ring; controlling the temperature of the outer ring and the inner ring as a function of the temperature difference between the outer ring and the inner ring so as to keep the preload within the predetermined acceptance range.

In this way, it is possible to optimize both the working life of the bearing and the efficiency of the electric machine.

In certain embodiments, the step of estimating the preload comprises calculating the preload on the basis of the structural, dimensional, and assembly characteristics, and the temperature of the bearing.

In this way, it is possible to achieve a reliable estimate of the preload on the bearing.

In certain embodiments, the step of correcting the preload on the bearing comprises directly or indirectly heating or cooling the outer ring and/or inner ring.

This enables full active control of the preload of the bearing.

In certain embodiments, the control method comprises determining the temperature of the outer ring and the inner ring, or of the supporting structures close to them. In this way, it is possible to implement a closed-cycle control algorithm.

The temperature of the outer ring and the inner ring is, in certain embodiments, closed-cycle controlled by determining the temperature of the outer ring and the inner ring, or the temperature close to them, but open-cycle controls are not excluded.

The present disclosure also relates to a program configured to control the preload of a bearing.

According to the present disclosure, there is provided a computer program loadable directly into a memory of a control unit to perform the steps in the method according to the present disclosure when the program is implemented by the control unit.

The program may also be stored in a mobile memory on a readable medium on which the program is stored.

The present disclosure also relates to a control system configured to control the preload of a wind turbine bearing.

According to the present disclosure, there is provided a control system configured to control the preload of a wind turbine bearing, the control system comprising a control unit configured to estimate the preload on the bearing at least as a function of the temperature of the outer ring and the inner ring; compare the estimated preload with a predetermined acceptance range; and correct the preload on the bearing when the preload is outside the acceptance range; at least one first sensor configured to detect the temperature of the outer ring; at least one second sensor configured to detect the temperature of the inner ring, wherein the control unit is configured to calculate the temperature difference between the outer ring and the inner ring and to control a first and a second control device to adjust the temperature of the outer ring and the inner ring respectively as a function of the temperature difference between the outer ring and the inner ring so as to keep the preload within the predetermined acceptance range.

The control system provides for optimizing the working life of the bearing and the efficiency of the wind turbine electric machine relatively cheaply and relatively easily. In certain embodiments, the control unit is configured to calculate the preload on the basis of the structural, dimensional, and assembly characteristics, and the temperature of the bearing.

The control unit is, in certain embodiments, programmable, has a memory in which to store bearing data, is configured to receive outside information, such as the detected temperatures of the outer ring and inner ring, and is configured to emit control signals to control a first and second control device.

The control unit is also configured to emit alarm signals in the event of anomalous operating situations with respect to recorded history data.

The present disclosure also relates to a wind turbine.

According to the present disclosure, there is provided a wind turbine configured to produce electric energy, the wind turbine comprising a blade assembly rotatable about an axis of rotation; a rotary electric machine comprising a stator, and a rotor connected to the blade assembly; a bearing configured to support the blade assembly about the axis of rotation; and a control system configured to control the preload of the bearing and in accordance with the present disclosure.

The above configuration provides for achieving a relatively small air gap, and improving the efficiency, of the rotary electric machine.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which:

FIG. 2 shows a larger-scale longitudinal section, with parts removed for clarity, of the FIG. 1 wind turbine equipped with a bearing preload control system in accordance with the present disclosure;

DETAILED DESCRIPTION

Figure 1:
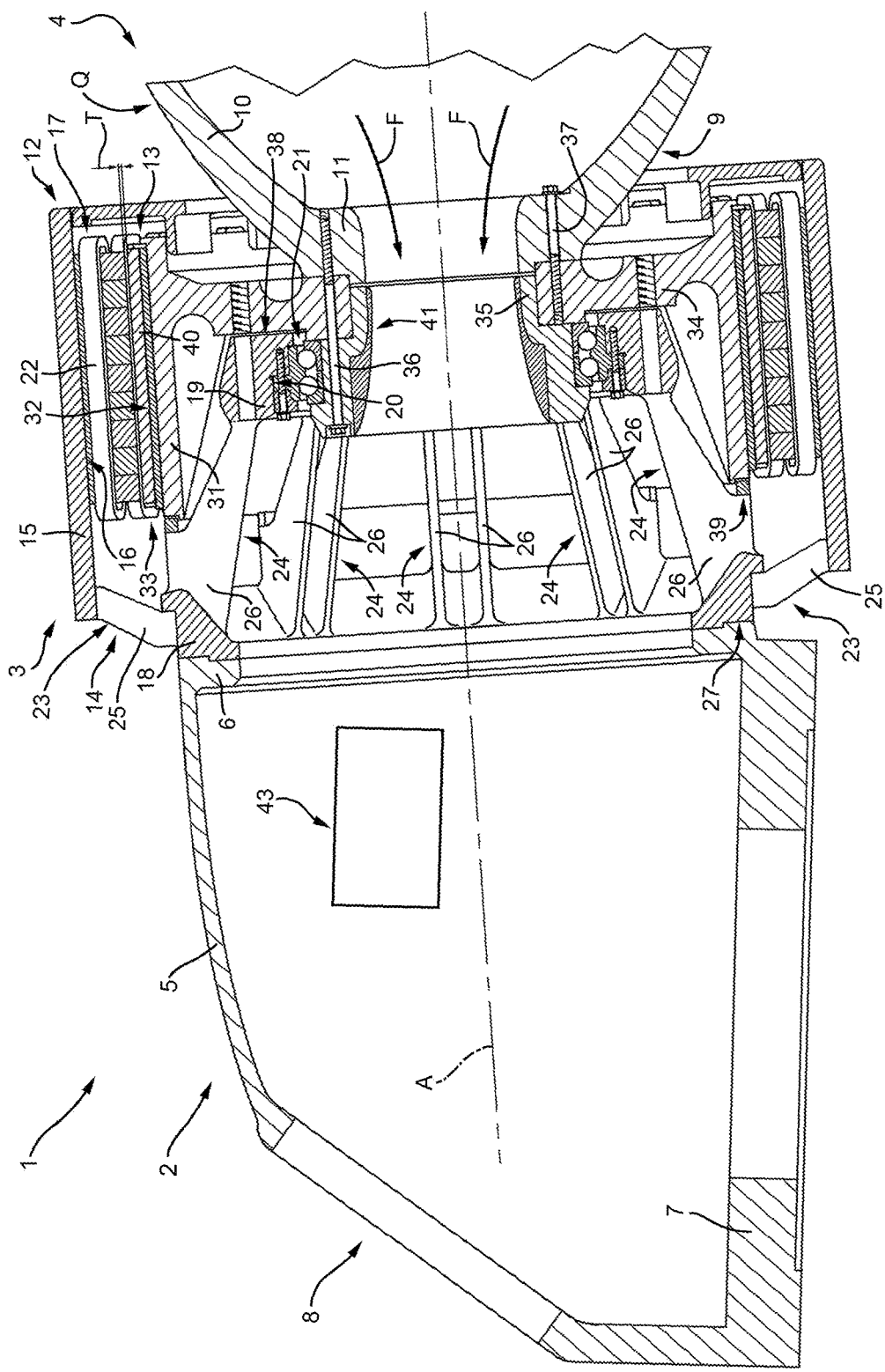
FIG. 1 shows a longitudinal section, with parts removed for clarity, of a wind turbine in accordance with the present disclosure.

Referring now to the example embodiments of the present disclosure illustrated in FIGS. 1 to 6, number 1 in FIG. 1 indicates as a whole a wind turbine configured to produce electric energy. Wind turbine 1 is a direct-drive type. In the example shown, wind turbine 1 comprises a main frame 2; a rotary electric machine 3; and a blade assembly 4 which rotates about an axis of rotation A. Rotary electric machine 3 is located between main frame 2 and blade assembly 4 and, in addition to producing electric energy, serves to support blade assembly 4 and to transmit forces and moments induced by blade assembly 4 and rotary electric machine 3 itself to main frame 2.

In the example shown, main frame 2 is defined by a curved, tubular nacelle 5 comprising a circular end flange 6 for connection to rotary electric machine 3; an end flange 7 configured to house a pivot (not shown in the drawings) for connection to a vertical support (not shown in the drawings); and an opening 8 in the wall of nacelle 5, through which to insert and remove relatively large component parts. In certain embodiments, opening 8 is substantially aligned with end flange 6.

Blade assembly 4 comprises a hub 9 connected to rotary electric machine 3; and a plurality of blades (not shown in the drawings). Hub 9 comprises a hollow member 10 configured to support the blades (not shown in the drawings); and a flange 11 for connection to rotary electric machine 3.

Rotary electric machine 3 extends about axis of rotation A, and is substantially tubular, so as to form a passage between the hollow main frame 2 and hollow hub 9.

Rotary electric machine 3 comprises a stator 12; a rotor 13 located inside stator 12 and which rotates with respect to stator 12 about axis of rotation A. Rotary electric machine 3 comprises a frame 14 configured to connect rotary electric machine 3 to main frame 2, and configured to support blade assembly 4, stator 12, and rotor 13.

Frame 14 extends about axis of rotation A, and comprises a tubular structure 15, which has a cylindrical face 16 and is configured to support a tubular active part 17 along cylindrical face 16; an annular flange 18 configured to connect rotary electric machine 3 to main frame 2 of wind turbine 1; and a ring 19 having an annular seat 20 for at least partly housing a bearing 21. In the example shown, one bearing 21 supports blade assembly 4 and rotor 13 integral with blade assembly 4.

In other words, frame 14 forms part of tubular stator 12, since tubular structure 15 forms part of tubular stator 12. Accordingly, tubular stator 12 comprises tubular structure 15 and active part 17.

Tubular active part 17 is divided into a plurality of axial active segments 22, each of which, in the example shown, has electric windings fitted to a ferromagnetic, substantially prismatic core extending predominantly parallel to axis of rotation A.

Tubular structure 15 is cylindrical and extends about axis of rotation A. Annular flange 18 is coaxial with tubular structure 15 and smaller in diameter than cylindrical face 16. And ring 19 is coaxial with tubular structure 15 and smaller in diameter than annular flange 18.

Annular flange 18 is located inside the end of tubular structure 15, along axis of rotation A.

Ring 19 is located inside the central area of tubular structure 15, along axis of rotation A.

Tubular structure 15, annular flange 18 and ring 19 are connected rigidly to one another by arms 23 and 24. More specifically, tubular structure 15 is connected to annular flange 18 by arms 23, which extend predominantly radially with a relatively small axial component; and annular flange 18 is connected to ring 19 by arms 24, which extend predominantly axially with a relatively small radial component.

Each arm 23 comprises two plates 25 parallel to each other and to axis of rotation A. And similarly, each arm 24 comprises two plates 26 also parallel to each other and to axis of rotation A.

Annular flange 18 has a seat 27 for connection to main frame 2 of wind turbine 1. Frame 14 and main frame 2 are, in certain embodiments, connected by a bolted joint (not shown in the drawings) between annular flange 18 and end flange 6, and by which the forces and moments induced by rotary electric machine 3 and blade assembly 4 are transmitted to main frame 2.

In certain embodiments, rotary electric machine 3, (i.e., wind turbine 1) has only bearing 21 to withstand the radial and axial loads transmitted from tubular rotor 13 and blade assembly 4 to main frame 2.

With reference to FIG. 2, bearing 21 is a rolling bearing, comprises an outer ring 28 and an inner ring 29, and is housed in annular seat 20 of ring 19. More specifically, outer ring 28 is housed in annular seat 20, and inner ring 29 is connected to tubular rotor 13. Annular seat 20 has a step profile, with cylindrical faces alternating with annular supporting faces. More specifically, outer ring 28 of bearing 21 is housed inside annular seat 20 and locked in place by a lock ring 30 bolted to ring 19 and outer ring 28.

Tubular rotor 13 comprises a tubular structure 31 with a cylindrical face 32; a tubular active part 33; and a radial structure 34 located inside tubular structure 31 and connected to bearing 21, more specifically to inner ring 29 of bearing 21. In other words, radial structure 34 is fixed, on one side, to bearing 21 and, on the opposite side, to hub 9, more specifically to flange 11 of hub 9.

Radial structure 34 is fixed to bearing 21 and hub 9 by two independently releasable bolted joints. Radial structure 34 is fixed using a lock ring 35 configured to partly house inner ring 29 of bearing 21, and the end of radial structure 34 with flange 11 of hub 9.

Tubular active parts 17 and 33 are separated radially by an air gap T.

One bolted joint comprises bolts, one of which, indicated 36 (in FIGS. 1 and 2), engages lock ring 35, radial structure 34 of rotor 13, and flange 11 of hub 9. The other bolted joint comprises bolts 37, which only engage radial structure 34 of rotor 13, and flange 11 of hub 9 (FIG. 1).

Radial structure 34 is also connectable by a joint, in particular a bolted joint, directly to ring 19. Radial structure 34 is located close to a face 38 of ring 19, and both radial structure 34 and ring 19 are configured to be connected integrally to each other. Radial structure 34 and ring 19 are connected to connect tubular rotor 13 directly to frame 14 when changing bearing 21.

Frame 14 has an emergency bearing 39 located along arms 24 and which is positioned contacting tubular rotor 13—in the example shown, tubular structure 31.

Like active part 17, active part 33 comprises axial active segments 40, each of which, in the example shown, has permanent magnets fitted to respective magnetic guides, is prismatic in shape, and extends predominantly parallel to axis of rotation A.

Tubular rotary electric machine 3 communicates directly with hollow hub 9, and is traversed by cooling air, which is indicated by arrows F, is appropriately blown inside rotary electric machine 3, and serves mainly to cool active parts 17 and 33. Cooling air F sweeps over the area where bearing 21 is assembled, and in particular the inner ring 29 area. To mitigate the effect of cooling air F, wind turbine 1 comprises an insulating cover 41 configured to insulate the area swept by cooling air F. In the example shown, insulating cover 41 is tubular and applied to lock ring 35. More specifically, insulating cover 41 is also shaped to guide the flow of cooling air F.

In addition to outer ring 28 and inner ring 29, bearing 21 also comprises rolling bodies 42 arranged in two rings. More specifically, inner ring 29 comprises two adjacent half-rings 29A and 29B. Wind turbine 1 comprises a control system 43 configured to control the preload of bearing 21. The term 'preload' is a general term relating to interference or clearance between outer ring 28, inner ring 29 and rolling bodies 42 of bearing 21. The preload is divided into a radial preload and an axial preload with reference to axis of rotation A. On wind turbines, the bearing is normally assembled with interference. In the example shown, the preload is set at the assembly stage, by hot-fitting, with a relatively small amount of interference, outer ring 28 inside seat 20 on ring 19, and inner ring 29 inside a seat on lock ring 35.

Lock ring 35 is also tightened to radial structure 34 by bolts 36. Tightening bolts 36 brings half-rings 29A and 29B closer together to produce the axial preload.

Control system 43 comprises a control device 44 configured to control outer ring 28; a control device 45 configured to control inner ring 29; a temperature sensor 46 configured to detect the temperature of outer ring 28; a temperature sensor 47 configured to detect the temperature of inner ring 29; and a control unit 48 configured to control control devices 44 and 45 on the basis of the detected temperatures of outer ring 28 and inner ring 29.

Outer ring 28 is the stationary part of bearing 21, while inner ring 29 is integral with rotor 13 and, in use, rotates about axis of rotation A with respect to outer ring 28.

Control device 44 comprises a thermostat 49; a heat exchanger 50 close to outer ring 28; and connecting lines 51 between thermostat 49 and heat exchanger 50.

Similarly, control device 45 comprises a thermostat 52; a heat exchanger 53 close to inner ring 29; connecting lines 54 between thermostat 52 and heat exchanger 53; and a rotary distributor 55 located along connecting lines 54 to connect the stationary part to the rotary part of control device 45.

In the example shown, heat exchanger 53 is located along the inner face of lock ring 35.

Control devices 44 and 45 are, in certain embodiments, electric, and heat exchangers 50 and 53 are electric resistors located close to, and, in certain embodiments, coiled about, outer ring 28 and inner ring 29, respectively.

In a variation of the present disclosure, control devices 44 and 45 are liquid types, so heat exchangers 50 and 53 can cool as well as heat outer ring 28 and inner ring 29.

Bearing 21 is selected on the basis of its capacity and other parameters, including operating temperature. And control system 43 provides for maintaining the temperature of outer ring 28 and inner ring 29 so as to keep the preload within a predetermined acceptance range I.

Figure 6:
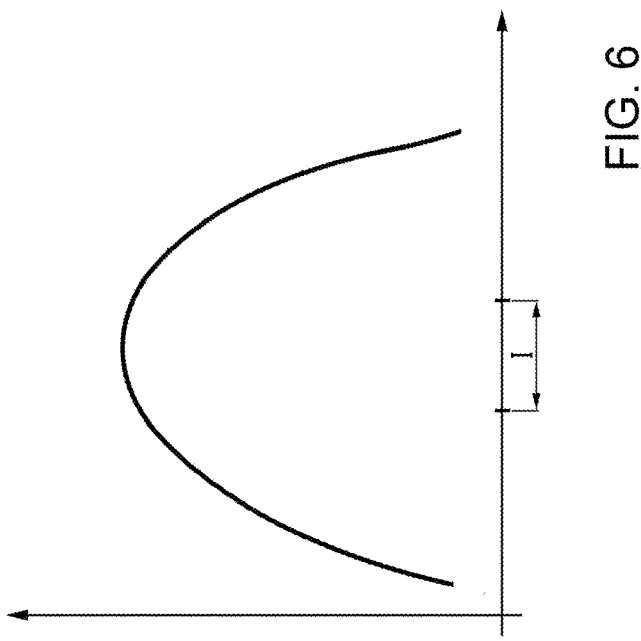
FIG. 6 shows a working life versus preload graph of the bearing.

The algorithm implemented by control system 43 is substantially based on the characteristics and the assembly conditions of bearing 21, on the thermal deformation of bearing 21 as a function of the temperature of outer ring 28 and inner ring 29, and on the variations in preload as a function of said thermal deformation. Given this data, it is possible to calculate the preload as a function of the temperature of outer ring 28 and inner ring 29. And the calculated preload is compared with the predetermined preload acceptance range I shown in FIG. 6. As shown in FIG. 6, the preload acceptance range I (x axis) is chosen to ensure a relatively long predicted working life (y axis) of bearing 21.

Control unit 48 is programmable, and comprises a memory in which to store the characteristics of bearing 21. Control unit 48 is configured to calculate the deformation of bearing 21 on the basis of the detected temperatures of outer ring 28 and inner ring 29, and/or the difference between the detected temperatures of outer ring 28 and inner ring 29. Control unit 48 is configured to calculate the preload on the basis of the thermal deformation of outer ring 28 and inner ring 29; and to compare the calculated preload with preload acceptance range I. If the calculated preload does not fall within acceptance range I, the control unit commands thermostats 49 and 52 to heat and/or cool outer ring 28 and/or inner ring 29 to bring the preload back within acceptance range I.

Control unit 48 is configured to memorize the temperature data of outer ring 28 and inner 29 together with data detected and memorized by the control unit controlling wind turbine 1 as a whole, so as to determine any anomalous behaviour of bearing 21. For example, for a given or designated external temperature, cooling system efficiency, wind speed, and blade angle, overheating of bearing 21 may be detected, and which may be considered anomalous in the light of other operating conditions. In which case, control unit 48 is configured to emit an alarm signal.

In relatively very cold climates, and when wind turbine 1 is re-started, the temperatures of outer ring 28 and inner ring 29 are below the optimum operating parameters of bearing 21, so both rings must be heated.

Other environmental and operating conditions make it necessary to heat outer ring 28 and inner ring 29 differently. This differential temperature of outer ring 28 and inner ring 29 is made possible by control system 43.

Figure 3:
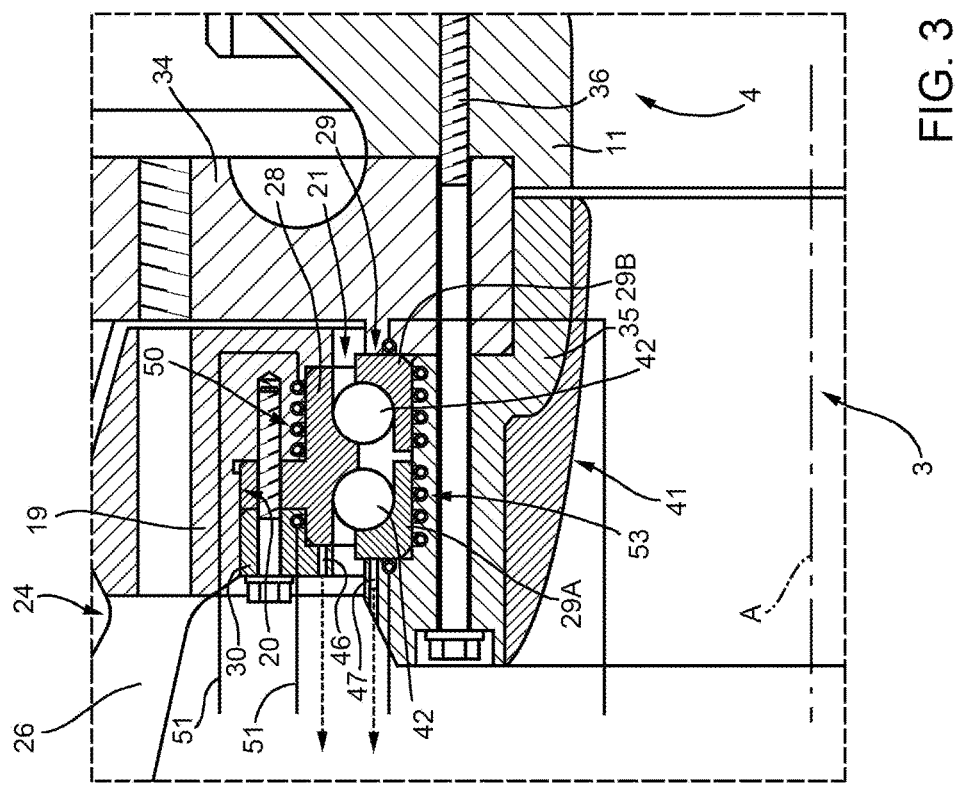
FIG. 3 shows a larger-scale longitudinal section, with parts removed for clarity, of a detail of a variation of the present disclosure.

In the FIG. 3 variation, heat exchanger 53 is located between lock ring 35 and inner ring 29 of bearing 21.

Figure 4:
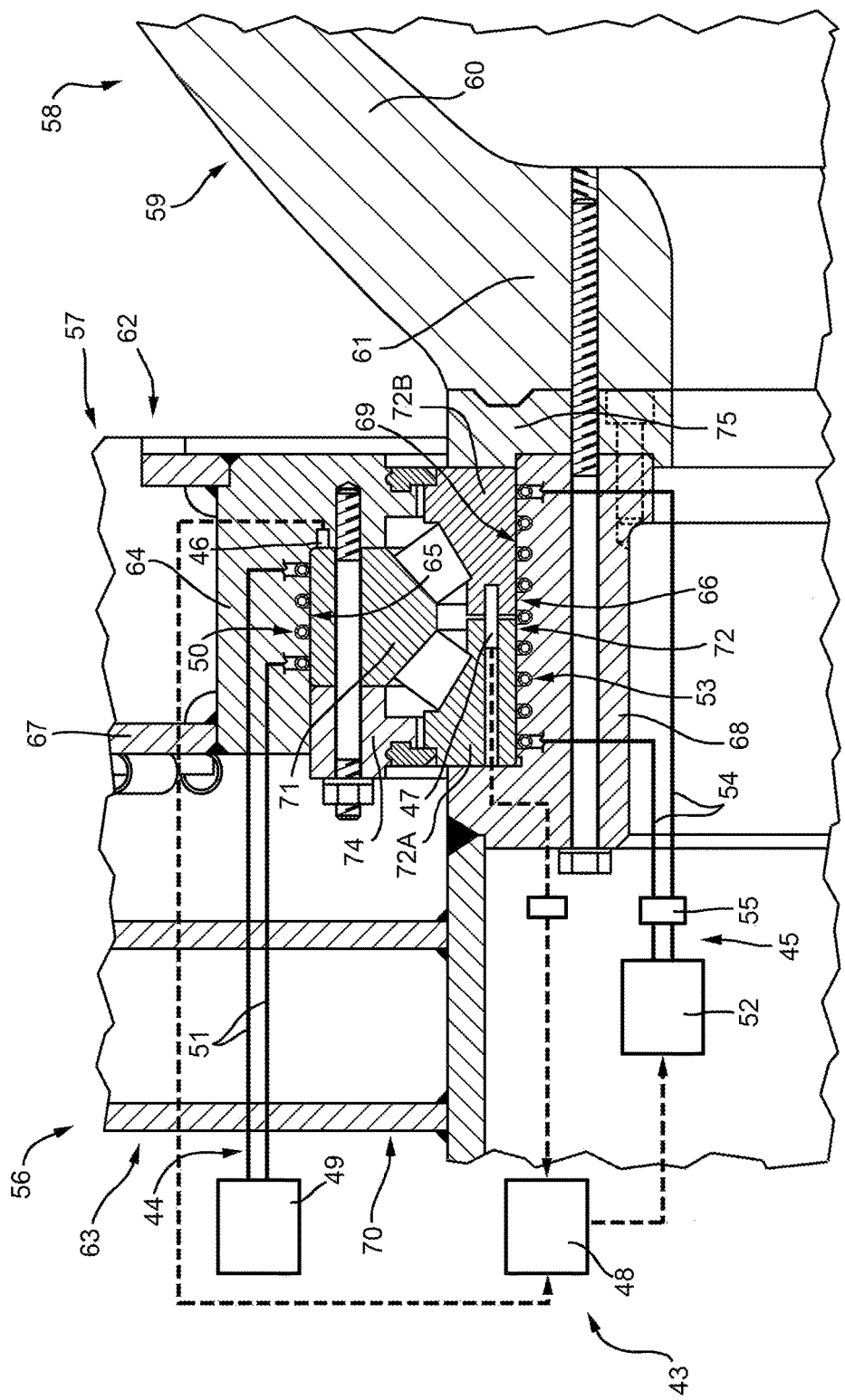
FIG. 4 shows a longitudinal section, with parts removed for clarity, of a wind turbine in accordance with a further embodiment of the present disclosure.

Number 56 in FIG. 4 indicates a wind turbine configured to produce electric energy. Wind turbine 56 is a direct-drive type and, in the example shown, comprises a rotary electric machine 57; and a blade assembly 58 which rotates about an axis of rotation A. In addition to producing electric energy, rotary electric machine 57 also serves to support blade assembly 58 and to transmit forces and moments induced by blade assembly 58 and rotary electric machine 57 itself to the main frame (not shown in the drawings) of wind turbine 56.

Blade assembly 58 comprises a hub 59 connected to rotary electric machine 57; and a plurality of blades (not shown in the drawings). Hub 59 comprises a hollow member 60 configured to support the blades (not shown in the drawings); and a flange 61 for connection to rotary electric machine 57.

Rotary electric machine 57 is substantially tubular, so as to form a space for access to hollow hub 59.

Rotary electric machine 57 comprises a stator 62; and a rotor 63 located inside stator 62. Stator 62 comprises a ring 64 having an annular seat 65 for at least partly housing a bearing 66; and a radial structure 67 configured to connect ring 64 to a tubular structure (not shown in the drawings). In the example shown, one bearing 66 supports blade assembly 58 and rotor 63 integral with blade assembly 58.

Rotor 63 comprises a ring 68 with an annular seat 69 configured to house bearing 66; and a radial structure 70 configured to connect ring 68 to a further tubular structure (not shown in the drawings).

In certain embodiments, rotary electric machine 57 (i.e., wind turbine 56) has only bearing 66 to withstand radial and axial forces and tipping moments. Bearing 66 is a rolling bearing and comprises an outer ring 71 and an inner ring 72. In the example shown, bearing 66 is a rolling bearing with two rings of rolling bodies 73—in the example shown, rollers. More specifically, outer ring 71 is housed in annular seat 65, and inner ring 72 is housed in annular seat 69 on ring 68 of rotor 63. Outer ring 71 of bearing 66 is locked inside annular seat 65 by a lock ring 74 bolted to ring 64 and outer ring 71.

Inner ring 72 comprises two half-rings 72A and 72B, which are arranged axially adjacent inside seat 69, and are locked axially by a lock ring 75 and by a bolted joint by which to set the axial preload.

Wind turbine 56 comprises a control system 43 as described with reference to FIG. 2. Heat exchanger 50 is housed inside grooves formed in ring 64 of stator 62, at annular seat 65, so as to directly contact outer ring 71. Likewise, heat exchanger 53 is housed inside grooves formed in ring 68 of rotor 63, at annular seat 69, so as to directly contact inner ring 72.

Temperature sensor 46 is located inside a space in ring 64, between ring 64 and outer ring 71, and, in certain embodiments, along a front face of outer ring 71, at a given or designated distance from heat exchanger 50. And likewise, temperature sensor 47 is located inside a space in ring 68, such as between ring 68 and inner ring 72, and in certain embodiments, facing a front face of inner ring 72, and at a given or designated distance from heat exchanger 53.

Figure 5:
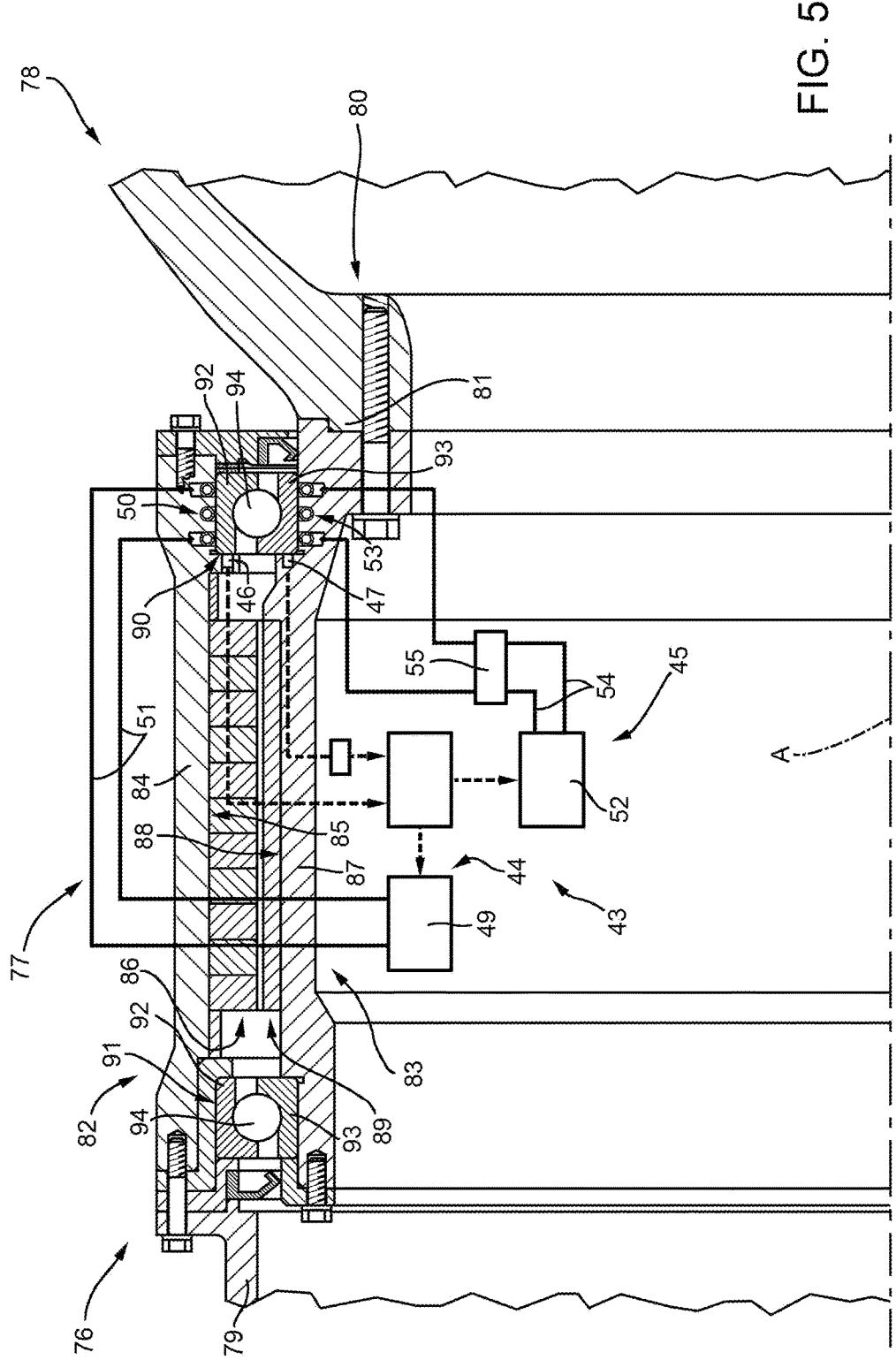
FIG. 5 shows a longitudinal section, with parts removed for clarity, of a wind turbine in accordance with a further embodiment of the present disclosure.

Number 76 in the FIG. 5 embodiment indicates an electric energy producing wind turbine. Wind turbine 76 is a direct-drive type and, in the example shown, comprises a rotary electric machine 77; and a blade assembly 78 which rotates about an axis of rotation A. In addition to producing electric energy, rotary electric machine 77 also serves to support blade assembly 78 and to transmit forces and moments induced by blade assembly 78 and rotary electric machine 77 itself to the main frame 79 of wind turbine 76.

Blade assembly 78 comprises a hollow hub 80 connected to rotary electric machine 77; and a plurality of blades (not shown in the drawings). Hub 80 comprises a flange 81 for connection to rotary electric machine 77.

Rotary electric machine 77 extends about axis of rotation A, and is substantially tubular to form a space for access to hollow hub 80.

Rotary electric machine 77 comprises a stator 82; and a rotor 83 located inside stator 62, and which rotates about axis of rotation A with respect to stator 82. Stator 82 comprises a tubular structure 84 having a cylindrical face 85 and configured to support a tubular active part 86 along cylindrical face 85.

Rotor 83 comprises a tubular structure 87 with a cylindrical face 88; and a tubular active part 89 fitted to cylindrical face 88 of tubular structure 87.

Tubular structures 84 and 87 are connected in rotary manner by two bearings 90 and 91 located at opposite ends of tubular structures 84 and 87, which have reinforcing rings at the ends, and assembly rings. Each bearing 90, 91 comprises an outer ring 92, an inner ring 93, and a ring of rolling bodies 94. Bearing 90 is stressed more than bearing 91, is preloaded with interference, and is actively controlled by control system 43. In this case, the grooves housing heat exchangers 50 and 53 are formed in tubular structures 84 and 87, at end seats of bearings 90 and 91.

Clearly, changes may be made to the control method and system and the wind turbine according to the present disclosure without, however, departing from the protective scope of the accompanying Claims. In particular, the control method and system described and claimed also apply to wind turbines with overgears and with structures other than those described with reference to the attached drawings, and may also be used to advantage for controlling bearings other than those described. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of controlling a preload of a wind turbine bearing, said method comprising:
   detecting a temperature of an outer ring of the wind turbine bearing;
   detecting a temperature of an inner ring of the wind turbine bearing;
   calculating a temperature difference between the detected temperature of the outer ring of the wind turbine bearing and the detected temperature of the inner ring of the wind turbine bearing;
   estimating the preload on the wind turbine bearing as a function of the detected temperature of the outer ring of the wind turbine bearing and the detected temperature of the inner ring of the wind turbine bearing;
   comparing the estimated preload with a predetermined acceptance range; and
   correcting the preload on the wind turbine bearing when the preload is outside the predetermined acceptance range by controlling, via a first heat exchanger, the temperature of the outer ring of the wind turbine bearing and, via a second heat exchanger, the temperature of the inner ring of the wind turbine bearing as a function of the calculated temperature difference between the detected temperature of the outer ring of the wind turbine bearing and the detected temperature of the inner ring of the wind turbine bearing to keep the preload on the wind turbine bearing within the predetermined acceptance range.

2. The method of claim 1, wherein estimating the preload includes calculating the preload based on at least one of: a structural characteristic of the wind turbine bearing, a dimensional characteristic of the wind turbine bearing, and an assembly characteristic of the wind turbine bearing.

3. The method of claim 1, wherein correcting the preload on the wind turbine bearing includes heating the outer ring of the wind turbine bearing.

4. The method of claim 1, wherein correcting the preload on the wind turbine bearing includes cooling the outer ring of the wind turbine bearing.

5. The method of claim 1, wherein correcting the preload on the wind turbine bearing includes heating the inner ring of the wind turbine bearing.

6. The method of claim 1, wherein correcting the preload on the wind turbine bearing includes cooling the inner ring of the wind turbine bearing.

7. The method of claim 1, wherein correcting the preload on the wind turbine bearing includes at least two selected from the group consisting of: heating the outer ring of the wind turbine bearing, cooling the outer ring of the wind turbine bearing, heating the inner ring of the wind turbine bearing, and cooling the inner ring of the wind turbine bearing.

8. The method of claim 1, which includes controlling, via the first heat exchanger, the temperature of the outer ring of the wind turbine bearing as a function of the detected temperature of the outer ring of the wind turbine bearing.

9. The method of claim 1, which includes controlling, via the second heat exchanger, the temperature of the inner ring of the wind turbine bearing as a function of the detected temperature of the inner ring of the wind turbine bearing.

10. The method of claim 1, which includes automatically correcting the preload on the wind turbine bearing when the preload is outside the predetermined acceptance range.

11. A non-transitory computer readable medium including a plurality of instructions, which when executed by a control unit cause the control unit to:
    detect a temperature of an outer ring of a wind turbine bearing;
    detect a temperature of an inner ring of the wind turbine bearing;
    calculate a temperature difference between the detected temperature of the outer ring of the wind turbine bearing and the detected temperature of the inner ring of the wind turbine bearing;
    estimate a preload on the wind turbine bearing as a function of the detected temperature of the outer ring of the wind turbine bearing and the detected temperature of the inner ring of the wind turbine bearing;
    compare the estimated preload with a predetermined acceptance range; and
    cause a correction of the preload on the wind turbine bearing when the preload is outside the predetermined acceptance range by controlling, via a first heat exchanger, the temperature of the outer ring of the wind turbine bearing and, via a second heat exchanger, the temperature of the inner ring of the wind turbine bearing as a function of the calculated temperature difference between the detected temperature of the outer ring of the wind turbine bearing and the detected temperature of the inner ring of the wind turbine bearing to keep the preload on the wind turbine bearing within the predetermined acceptance range.

12. A wind turbine bearing preload control system comprising:
    at least one first sensor configured to detect a temperature of an outer ring of a wind turbine bearing;
    at least one second sensor configured to detect a temperature of an inner ring of the wind turbine bearing; and
    a control unit configured to:

calculate a temperature difference between the temperature of outer ring of the wind turbine bearing and the temperature of the inner ring of the wind turbine bearing, estimate a preload on the wind turbine bearing as a function of the temperature of the outer ring of the wind turbine bearing and the temperature of the inner ring of the wind turbine bearing, compare the estimated preload on the wind turbine bearing with a predetermined acceptance range, and cause a correction of the preload on the wind turbine bearing when the preload is outside the acceptance range by controlling a first control device and a second control device to adjust, via a first heat exchanger, the temperature of the outer ring of the wind turbine bearing and, via a second heat exchanger, the temperature of the inner ring of the wind turbine bearing as a function of the calculated temperature difference between the temperature of the outer ring of the wind turbine bearing and the temperature of the inner ring of the wind turbine bearing to keep the preload on the wind turbine bearing within the predetermined acceptance range.

13. The wind turbine bearing preload control system of claim 12, wherein the control unit is configured to calculate the preload based on at least one of: a structural characteristic of the wind turbine bearing, a dimensional characteristic of the wind turbine bearing, and an assembly characteristic of the wind turbine bearing.

14. The wind turbine bearing preload control system of claim 12, wherein the first control device is configured to heat the outer ring of the wind turbine bearing to correct the preload on the wind turbine bearing.

15. The wind turbine bearing preload control system of claim 12, wherein the first control device is configured to cool the outer ring of the wind turbine bearing to correct the preload on the wind turbine bearing.

16. The wind turbine bearing preload control system of claim 12, wherein the second control device is configured to heat the inner ring of the wind turbine bearing to correct the preload on the wind turbine bearing.

17. The wind turbine bearing preload control system of claim 12, wherein the second control device is configured to cool the inner ring of the wind turbine bearing to correct the preload on the wind turbine bearing.

18. The wind turbine bearing preload control system of claim 12, wherein:
the first control device is configured to at least one of: heat the outer ring of the wind turbine bearing to correct the preload on the wind turbine bearing, and cool the outer ring of the wind turbine bearing to correct the preload on the wind turbine bearing; and
the second control device is configured to at least one of: heat the inner ring of the wind turbine bearing to correct the preload on the wind turbine bearing, and cool the inner ring of the wind turbine bearing to correct the preload on the wind turbine bearing.

19. The wind turbine bearing preload control system of claim 12, wherein the control unit is configured to control the first control device to adjust, via the first heat exchanger, the temperature of the outer ring of the wind turbine bearing as a function of the detected temperature of the outer ring of the wind turbine bearing.

20. The wind turbine bearing preload control system of claim 12, wherein the control unit is configured to control the second control device to adjust via the second heat exchanger, the temperature of the inner ring of the wind turbine bearing as a function of the detected temperature the inner ring of the wind turbine bearing.

21. The wind turbine bearing preload control system of claim 12, wherein the control unit is configured to automatically cause the correction of the preload on the wind turbine bearing when the preload is outside the predetermined acceptance range.

22. An electric energy producing direct drive wind turbine comprising:
a blade assembly rotatable about an axis of rotation;
a rotary electric machine including:
a stator, and
a rotor connected to the blade assembly;
a bearing configured to support the blade assembly about the axis of rotation; and
a control system including:
at least one first sensor configured to detect a temperature of an outer ring of the bearing;
at least one second sensor configured to detect a temperature of an inner ring of the bearing; and
a control unit configured to:
calculate a temperature difference between the temperature of outer ring of the bearing and the temperature of the inner ring of the bearing,
estimate a preload on the bearing as a function of the temperature of the outer ring of the bearing and the temperature of the inner ring of the bearing,
compare the estimated preload on the bearing with a predetermined acceptance range, and
cause a correction the preload on the bearing when the preload is outside the acceptance range by controlling a first control device and a second control device to adjust, via a first heat exchanger, the temperature of the outer ring of the bearing and, via a second heat exchanger, the temperature of the inner ring of the bearing as a function of the calculated temperature difference between the temperature of the outer ring of the bearing and the temperature of the inner ring of the bearing to keep the preload on the bearing within the predetermined acceptance range.

23. The electric energy producing direct drive wind turbine of claim 22, wherein the bearing is thermally insulated.

24. The electric energy producing direct drive wind turbine of claim 22, wherein the rotary electric machine is a hollow tubular rotary electric machine, through which cooling air flows along the axis of rotation, and which includes an insulating cover at the inner ring of the bearing.

25. The electric energy producing direct drive wind turbine of claim 22, wherein:
the outer ring of the bearing is connected to the stator, and
the inner ring of the bearing is connected to the rotor.

26. The electric energy producing direct drive wind turbine of claim 22, wherein:
the stator includes:
a first tubular structure, and
a tubular first active part connected to the first tubular structure; and
the rotor includes:
a second tubular structure, and
a tubular second active part which:
is connected to the second tubular structure,
faces the tubular first active part, and
is separated from the tubular first active part by an air gap.

27. The electric energy producing direct drive wind turbine of claim 22, wherein the bearing is a rolling bearing configured to support a radial load and an axial load.

28. The electric energy producing direct drive wind turbine of claim 22, wherein the bearing includes two rings of rolling bodies.

29. The electric energy producing direct drive wind turbine of claim 28, wherein the rolling bodies are defined by rollers.

30. The electric energy producing direct drive wind turbine of claim 22, wherein the control unit is configured to automatically cause the correction of the preload on the bearing when the preload is outside the predetermined acceptance range.

* * * * *